UNITED STATES PATENT OFFICE.

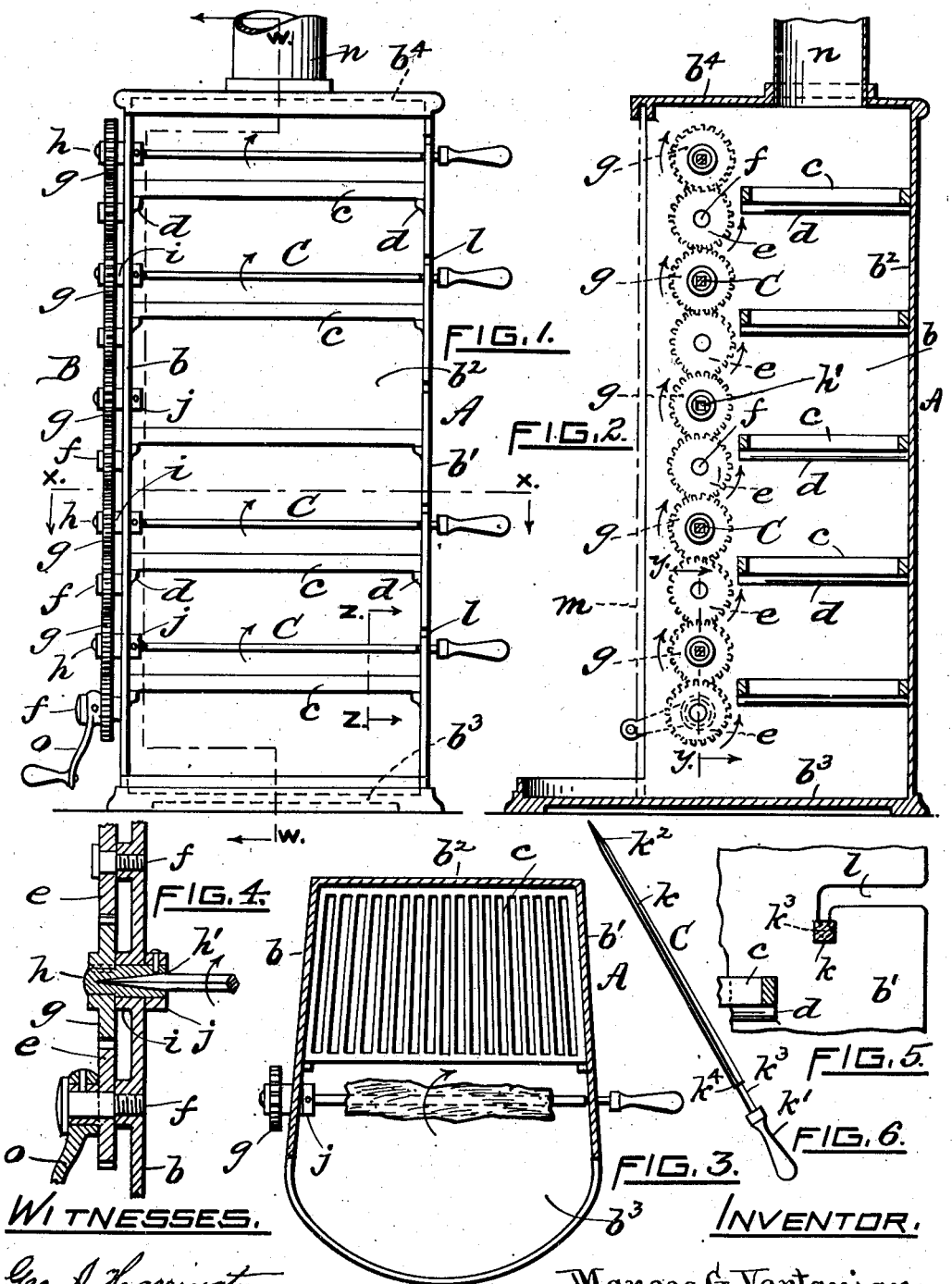

MANOOG G. VARTANIAN, OF PROVIDENCE, RHODE ISLAND.

BROILING APPARATUS.

No. 839,236.   Specification of Letters Patent.   Patented Dec. 25, 1906.

Application filed May 5, 1906. Serial No. 315,380.

*To all whom it may concern:*

Be it known that I, MANOOG G. VARTANIAN, a citizen of the United States, residing at the city of Providence, in the county of Providence and State of Rhode Island, have invented certain new and useful Improvements in Broiling Apparatus, of which the following is a specification.

My invention relates to improvements in that class of kitchen appliances that are used for broiling meats, fish, chickens, and similar articles of food; and the object of my invention is to provide a simple, effective, and convenient apparatus having a series of fire-grates mounted therein and a series of removable meat-holders rotatably mounted and driven by a suitable gearing arrangement, whereby steak, fish, or chickens may be cooked at the same time and each replaced or removed independent of the other in an expeditious manner.

In the accompanying sheet of drawings, Figure 1 represents a front elevation of my improved apparatus as in use. Fig. 2 is a side sectional view of the apparatus, taken in line $w$ $w$ of Fig. 1. Fig. 3 is a top plan sectional view taken in line $x$ $x$ of Fig. 1. Fig. 4 is an enlarged detail view taken in line $y$ $y$ of Fig. 2 and showing a portion of the gearing arrangement for rotating the meat-holders. Fig. 5 is an enlarged sectional view taken in line $z$ $z$ of Fig. 1 and showing the means for securing a meat-holder in position upon the casing of the apparatus. Fig. 6 represents a meat-holder removed from the apparatus.

Like reference characters indicate like parts.

A represents the casing of the apparatus comprising three vertically-arranged walls $b$, $b'$, and $b^2$, which terminate at one end with a base-plate $b^3$ and at the other end with a top plate $b^4$.

A series of fire-grates $c$ $c$ are arranged one over the other and equidistantly apart within the casing, and said grates rest upon flanges $d$ $d$, integral with the side walls $b$ $b'$ thereof. These grates $c$ $c$ are adapted to receive coke fuel upon them, and whatever ashes pass through from said grates fall upon the base-plate $b^3$ of the casing.

On the side wall $b$ of the casing is mounted the gearing arrangement for rotating the meat-holders and comprising a series of spur-gears $e$ $e$ $e$ $e$ $e$, which are loosely mounted on studs $f$ $f$, secured in said wall $b$. Said train of gears $e$ mesh with a series of spur-gears $g$ $g$ $g$ $g$ $g$, which are secured upon stud-shafts $h$ $h$, that project loosely through hubs $i$ $i$ integral with the side wall $b$, in the manner shown in Fig. 4. On each stud-shaft $h$ is secured a collar $j$, which abuts the inner surface of the wall $b$, and said collar is adapted to prevent lateral movement of said shaft. Each and all of the gears $e$ and $g$ are of equal diameter, having their axial centers in vertical alinement to each other and situated relatively beyond the front of the grates $c$ $c$, as shown in dotted position in Fig. 2.

C C are the meat-holders, each of which is in the form of a rod $k$, Fig. 6, having a handle $k'$ secured at one end thereof and its opposite end portion tapering to a point, as at $k^2$, and each portion $k$ $k^2$ made square in cross-section, as shown in Figs. 2 and 5.

Each stud-shaft $h$ of the gears $g$ is provided with a longitudinally-arranged square-shaped opening, as at $h'$ in Fig. 4, to freely receive the pointed portion $k^2$ of each meat-holder C.

The side wall $b'$ of the casing is provided with a series of right-angled slots $l$ $l$, which extend inwardly and downwardly from the edge of said wall, as seen in Fig. 5, so as to form a journal-bearing to receive a reduced cylindrical portion $k^3$, formed on the rod $k$ of each meat-holder, in the manner shown in Figs. 5 and 6. The shoulder $k^4$, formed by the reduced portion on the rod $k$, abuts the inner surface of the side wall $b'$, and thereby prevents displacement of each meat-holder when in horizontal position upon the apparatus.

A cover $m$ (indicated by broken line in Fig. 2) is used to close the front of the casing after starting the coke fire and until the smoke from the coke has passed from the flue-pipe $n$, secured in the top of the casing, after which this cover is removed and the apparatus is then ready for use.

By means of the slot arrangement in the wall $b'$ of the casing the holders C C are readily placed in position to receive the broiling of the different articles of food and are easily removed when desired.

I show the gearing arrangement as driven by a crank or hand-lever $o$, which is made fast upon the hub of the lower gear $e$; but in a kitchen of a large saloon or hotel I prefer to use a motor, clockwork, or any other convenient form of moving power to drive said gearing arrangement.

What I claim, and desire to secure by Letters Patent, is—

In a broiling apparatus, the combination of a casing having a series of fire-grates located one above the other therein; a gearing arrangement comprising a series of gears loosely mounted on studs secured in said casing, and a second series of gears secured upon stud-shafts which rotate in said casing, and said stud-shafts provided each with a longitudinally-arranged square-shaped aperture; means to rotate said gearing arrangement; a series of right-angled slots in one wall of the casing, and a series of meat-holders independent of the apparatus, each of said holders in the form of a rod having a flat-sided tapering point to fit in the aperture of the stud-shafts of last-mentioned series of gears and also a reduced portion to enter the slots of said casing, substantially as set forth.

In testimony whereof I affix my signature in presence of two witnesses.

MANOOG G. VARTANIAN.

Witnesses:
GEO. A. HARRINGTON,
WM. M. EADS